(12) United States Patent
Hu et al.

(10) Patent No.: US 9,672,951 B2
(45) Date of Patent: Jun. 6, 2017

(54) METHOD FOR PREPARING GRAPHENE-BASED LIFEPO$_4$/C COMPOSITE MATERIAL

(71) Applicant: GUOGUANG ELECTRIC COMPANY LIMITED, Guangzhou (CN)

(72) Inventors: Guorong Hu, Changsha (CN); Yanbing Cao, Changsha (CN); Kaipeng Wu, Changsha (CN); Zhongdong Peng, Changsha (CN); Ke Du, Changsha (CN)

(73) Assignee: GUOGUANG ELECTRIC COMPANY LIMITED, Guangzhou (CN)

( * ) Notice: Subject to any disclaimer, the term of this patent is extended or adjusted under 35 U.S.C. 154(b) by 72 days.

(21) Appl. No.: 14/401,489

(22) PCT Filed: May 9, 2013

(86) PCT No.: PCT/CN2013/075363
§ 371 (c)(1),
(2) Date: Nov. 14, 2014

(87) PCT Pub. No.: WO2013/170720
PCT Pub. Date: Nov. 21, 2013

(65) Prior Publication Data
US 2015/0102267 A1    Apr. 16, 2015

(30) Foreign Application Priority Data

May 14, 2012  (CN) .......................... 2012 1 0148114

(51) Int. Cl.
*H01B 1/06* (2006.01)
*H01M 4/04* (2006.01)
(Continued)

(52) U.S. Cl.
CPC ............. *H01B 1/06* (2013.01); *C01B 25/375* (2013.01); *C01B 25/45* (2013.01); *C01B 31/043* (2013.01);
(Continued)

(58) Field of Classification Search
CPC ......... H01B 1/04; H01B 1/06; H01M 4/0471; H01M 4/049; H01M 4/136; H01M 4/364;
(Continued)

(56) References Cited

U.S. PATENT DOCUMENTS

2009/0155689 A1    6/2009  Zaghib et al.
2013/0047423 A1*   2/2013  Miwa .................... H01M 4/625
                                                                29/623.5
(Continued)

FOREIGN PATENT DOCUMENTS

CN        101944593 A        1/2011
CN        102148371 A   *    8/2011
(Continued)

OTHER PUBLICATIONS

PCT International Search Report and Written Opinion dated Aug. 22, 2013, issued in International Application No. PCT/CN2013/075363 (22 pages).

*Primary Examiner* — Harold Pyon
*Assistant Examiner* — Matthew R Diaz

(57) ABSTRACT

The present invention relates to a method for preparing a graphene-based LiFePO$_4$/C composite material, to solve the problem of poor conductivity and rate performance of lithium iron phosphate cathode material. The main features of the present invention include the steps of: 1) preparing an iron salt solution having graphene oxide dispersed therein; 2) preparing a ferric phosphate/graphene oxide precursor; 3) preparing the graphene-based LiFePO$_4$/C composite material. The beneficial effects of the method is that the process (Continued)

is simple, easy to control and the resulted graphene-based LiFePO$_4$/C composite material has high specific capacity, good recycle performance and excellent rate capability is particularly suitable to the field of the power battery application.

13 Claims, 3 Drawing Sheets

(51) Int. Cl.

| | |
|---|---|
| H01M 4/583 | (2010.01) |
| H01M 4/58 | (2010.01) |
| H01M 4/36 | (2006.01) |
| H01M 4/1397 | (2010.01) |
| H01M 4/62 | (2006.01) |
| C01B 25/37 | (2006.01) |
| C01B 25/45 | (2006.01) |
| C01B 31/04 | (2006.01) |
| H01M 4/136 | (2010.01) |

(52) U.S. Cl.
CPC ........... *C01B 31/0446* (2013.01); *H01M 4/04* (2013.01); *H01M 4/049* (2013.01); *H01M 4/0471* (2013.01); *H01M 4/136* (2013.01); *H01M 4/1397* (2013.01); *H01M 4/364* (2013.01); *H01M 4/583* (2013.01); *H01M 4/5825* (2013.01); *H01M 4/625* (2013.01)

(58) Field of Classification Search
CPC ...... H01M 4/5825; H01M 4/583; H01M 4/04; H01M 4/1397; H01M 4/625; C01B 31/034; C01B 31/0438; C01B 31/0046; C01B 31/0484; C01B 24/265; C01B 24/305; C01B 24/306; C01B 24/375; C01B 24/39; C01B 24/395; C01B 24/45; C01B 25/265; C01B 25/306; C01B 25/375; C01B 25/39; C01B 25/395; C01B 25/45; C01B 31/043; C01B 31/0328
See application file for complete search history.

(56) References Cited

U.S. PATENT DOCUMENTS

2013/0157135 A1\* 6/2013 Zhou ................... C01B 33/023
429/221
2013/0177784 A1\* 7/2013 Zhou ................... C01B 25/375
429/50

FOREIGN PATENT DOCUMENTS

| CN | 102299326 A | | 12/2011 | |
|---|---|---|---|---|
| CN | WO 2012031401 A1 | \* | 3/2012 | ........... C01B 33/023 |
| CN | WO 2012040920 A1 | \* | 4/2012 | ........... C01B 25/375 |
| CN | 102544493 A | \* | 7/2012 | |
| CN | 102544516 A | \* | 7/2012 | |
| CN | 102583292 A | \* | 7/2012 | |
| CN | 102683697 A | | 9/2012 | |
| WO | 2013170720 A1 | | 11/2013 | |

\* cited by examiner

METHOD FOR PREPARING GRAPHENE-BASED LIFEPO$_4$/C COMPOSITE MATERIAL

TECHNICAL FIELD

The present invention generally relates to the field of preparation of material for battery cathode, and more particularly relates to a method for preparing of graphene-based LiFePO$_4$/C composite material.

BACKGROUND

Energy is an important material basis for survival and development of human society. With the development of economy and society, demand for energy is increasing. Today, due to global warming and ecological environment deteriorating, lithium-ion batteries as a green energy has gained growing concern.

More attention has been paid to lithium iron phosphate due to its higher voltage platform (3.4-3.5V), higher theoretical capacity (170 mA·h/g), good recycle performance (LiFePO$_4$ can be recycled more than 2000 times under optimized synthesis conditions), good stability, good high temperature performance, good safety performance, simple synthesis process, environmentally friendly, nontoxicity, abundant raw material and other characteristics.

However, the uniqueness of the structure of the lithium iron phosphate blocks conduction of electrons, so that electronic conductivity of lithium iron phosphate is very low ($10^{-9}$ S·cm$^{-1}$), resulting in poor electrochemical performance. People often coat the surface of lithium iron phosphate particles with a layer of conductive carbon to increase its conductivity. Such as Chinese Patent (CN101483236) discloses a method for preparing lithium iron phosphate/carbon composite as cathode material of lithium ion battery, which includes mixing iron oxide hydroxide, lithium salt, and phosphonium salts in stoichiometric ratio; adding an appropriate amount of carbon source and liquid ball milling media; milling; reacting the mixture after drying at a certain temperature; and finally obtaining the lithium ferrous phosphate/carbon composite.

Graphene is a new material from carbon family which becomes very popular in recent years, with thickness of only 0.335 nm, and has a unique electronic structure and electrical properties. In the energy band structure of graphene, the valence band and the conduction band intersect at six vertices of the Fermi level, and in this sense, graphene is a material without energy gap, showing metallicity. In graphene of single layer, each carbon atom contributes a non-bonded electron, and these electrons can move freely in the crystal, giving graphene very good electrical conductivity. Typical electronic conduction velocity in graphene reaches 1/300 of the speed of light, much more than the conduction velocity of electron in a general semiconductor. Therefore, it is possible to combine excellent electrical properties of graphene with special electrochemical performance of lithium iron phosphate properly and cleverly to develop graphene-modified lithium iron phosphate cathode composite material. For example Chinese Patent (CN101752561A) discloses a graphene-modified lithium iron phosphate cathode active material and method for preparing thereof, as well as a lithium ion secondary battery on basis of the cathode active material, and the method includes dispersing graphene or graphene oxide and lithium iron phosphate in an aqueous solution; mixing well by stirring and ultrasonic, subsequently drying to obtain graphene or graphene oxide complexed lithium iron phosphate material, and then high temperature annealing to finally obtaining lithium iron phosphate cathode active material which only is subjected to simple graphene modification.

SUMMARY

Technical Problem

The present invention provides a method for preparing graphene-based LiFePO$_4$/C composite material, in order to solve problems, such as deficiency in existing lithium iron phosphate preparation process and poor conductivity and rate performance of lithium iron phosphate cathode material.

Technical Solutions

The technical solution employed to solve the technical problems in the application include the steps of:

1) Preparing an Iron Salt Solution Having Graphene Oxide Dispersed Therein

Graphene oxide and iron salt are dissolved in deionized water in graphene oxide:iron weight ratio of 0.1 to 0.3:1, and dispersed by ultrasonic to obtain the iron salt solution having graphene oxide dispersed therein;

2) Preparing a Ferric Phosphate/Graphene Oxide Precursor

The iron salt solution having graphene oxide dispersed therein prepared in step 1) is mixed with a phosphate solution to obtain a reaction mixture in which the molar ratio of Fe:P is 1:1 to 1.2. The reaction mixture is adjusted to pH 2 to 4 and then reacts under controlled temperature of 60° C. to 80° C. to obtain an emulsion. The emulsion is filtered, washed and dried to obtain the ferric phosphate/graphene oxide precursor;

3) Preparing the Graphene-Based LiFePO$_4$/C Composite Material

The ferric phosphate/graphene oxide precursor prepared in step 2) is blended with a lithium salt in Li:Fe molar ratio of 1 to 1.05:1, subjected to ball milling after adding a carbon source and then sintered under a reducing atmosphere condition at 600° C. to 700° C., to obtain the graphene-based LiFePO$_4$/C composite material.

Preferred embodiments of the invention are as follows:

In the iron salt solution having graphene oxide dispersed therein of step 1), the iron ion concentration is 0.5 to 2 mol/L.

Dispersion time by ultrasonic in step 1) is 2 to 5 hours.

Reaction time in step 2) is 3 to 6 hours; sintering time in step 2) is 5 to 10 hours.

Principle of the present invention is that positively charged Fe$^{3+}$ is adsorbed to the layers of the graphene oxide due to electrostatic force, by dispersing graphene oxide and a solution containing ferric ion by ultrasonic. By adding phosphates to react with Fe$^{3+}$ causing precipitation, the resulting ferric phosphate crystals nucleate and grow in situ on the layers of the graphene oxide, whereby obtaining ferric phosphate/graphene oxide precursor. In this process, the graphene oxide provides a template. Then the carbon coated surface, graphite-modified lithium iron phosphate cathode material, is obtained by high temperature heat treatment, in which graphene greatly reduces the contact resistance between the particles of lithium iron phosphate, thereby enhancing the conductivity of the material.

Other differences and advantages of the present invention in comparison with other inventions are: the graphene oxide solution and the ferric ion solution are mixed at the molecular level, and then precursor of the lithium iron phosphate nucleate and grow in situ on the surface of the graphene oxide and subsequently is lithiated to the lithium iron phosphate, thereby obtaining a uniformly dispersed structure of the graphene-lithium iron phosphate composite; the ferric phosphate and the graphene oxide form are formed as a whole after the ferric phosphate is loaded on the surface of the graphene oxide, which prevent the graphite oxide from agglomeration, thus a composite precursor of the ferric phosphate and the graphene oxide facilitate the operations of the subsequent filtration and washing steps, which is very helpful for industrial production.

The exemplary embodiments of the invention are as follows:

1) Preparing an Iron Salt Solution Having Graphene Oxide Dispersed Therein

Graphene oxide and iron salt are dissolved in deionized water in graphene oxide:iron weight ratio of 0.1 to 0.3:1 to prepare a mixture solution with an iron ion concentration of 0.5 to 2 mol/L, and then dispersed by ultrasonic for 2 to 5 hours, to obtain the iron salt solution having graphene oxide dispersed therein;

2) Preparing a Ferric Phosphate/Graphene Oxide Precursor

A phosphate solution is prepared to have the same concentration as that of iron ion in the iron salt solution having graphene oxide dispersed therein prepared in step 1).

The iron salt solution having graphene oxide dispersed therein prepared in step 1) and the phosphate solution in a Fe:P molar ratio of 1:1 to 1.2 are added in parallel flow to a reactor equipped with a stirrer. Meanwhile, the reaction liquor is adjusted to pH 2 to 4 using an alkaline solution, and then reacts under controlled temperature of 60° C. to 80° C. for 3 to 6 hours to give an emulsion. The resulted emulsion is filtered, washed and the residue is dried at 80° C. in an air dry oven for 24 hours, to give the ferric phosphate/graphene oxide precursor;

3) Preparing the Graphene-Based LiFePO$_4$/C Composite Material

The ferric phosphate/graphene oxide precursor of step 2) is blended with a lithium salt in Li:Fe molar ratio of 1 to 1.05:1, subjected to ball milling after adding a carbon source and then sintered under a reducing atmosphere condition at 600° C. to 700° C. for 5 to 10 hours, to obtain the graphene-based LiFePO$_4$/C composite material.

Preferred sources of raw materials in the present invention include:

The iron salt solution in said step 1) includes one of ferric sulphate, ferric chloride and ferric nitrate; also can be obtained by dissolving a ferrous salt and oxidizing it using excess $H_2O_2$. And the ferrous salt includes one of ferrous sulfate, ferrous chloride and ferrous nitrate;

The phosphate in said step 2) is one of phosphoric acid, ammonium biphosphate, ammonium monoacid phosphate, ammonium phosphate, sodium biphosphate, sodium monoacid phosphate, and sodium phosphate;

The alkaline solution in said step 2) is sodium hydroxide or ammonia, with a concentration of 0.5 to 5 mol/L;

The lithium salt in said step 3) is one of lithium carbonate, lithium hydroxide and lithium acetate;

The carbon source in said step 3) is at least one of glucose, sucrose, fructose, lactose, citric acid, starch, polyvinyl alcohol, polypropylene and phenolic resin, and added amount thereof is 5 to 20% of the theoretical mass of lithium iron phosphate;

The reducing atmosphere in said step 3) is a mixed gas in v/v of Ar:$H_2$=90:10 to 95:5 or $N_2$:$H_2$=90:10 to 95:5.

BENEFICIAL EFFECTS OF THE INVENTION

Beneficial Effects

The beneficial effects of the present invention are that: the invention makes full use of the excellent conductive properties of graphene in the synthesis of lithium iron phosphate cathode materials, to solve problems of deficiency in existing lithium iron phosphate preparation process, poor conductivity and poor recycle performance of lithium iron phosphate cathode material. The process of this invention is simple, easy to control and the resulted graphene-modified lithium iron phosphate/carbon composite material has high specific capacity, good recycle performance and excellent rate capability, and is suitable for power battery applications.

EXAMPLES

Examples of the Invention

In the following description, the examples are set forth for purposes of illustration rather than limitation.

Example 1

Graphene oxide and ferric sulfate are dissolved in deionized water in graphene oxide:iron weight ratio of 0.1:1, to prepare a mixture solution with an iron ion concentration of 1 mol/L, and then dispersed by ultrasonic for 3 hours, to obtain an iron salt solution having graphene oxide dispersed therein;

A phosphoric acid solution is prepared, with a concentration of 1 mol/L.

Figure 1:
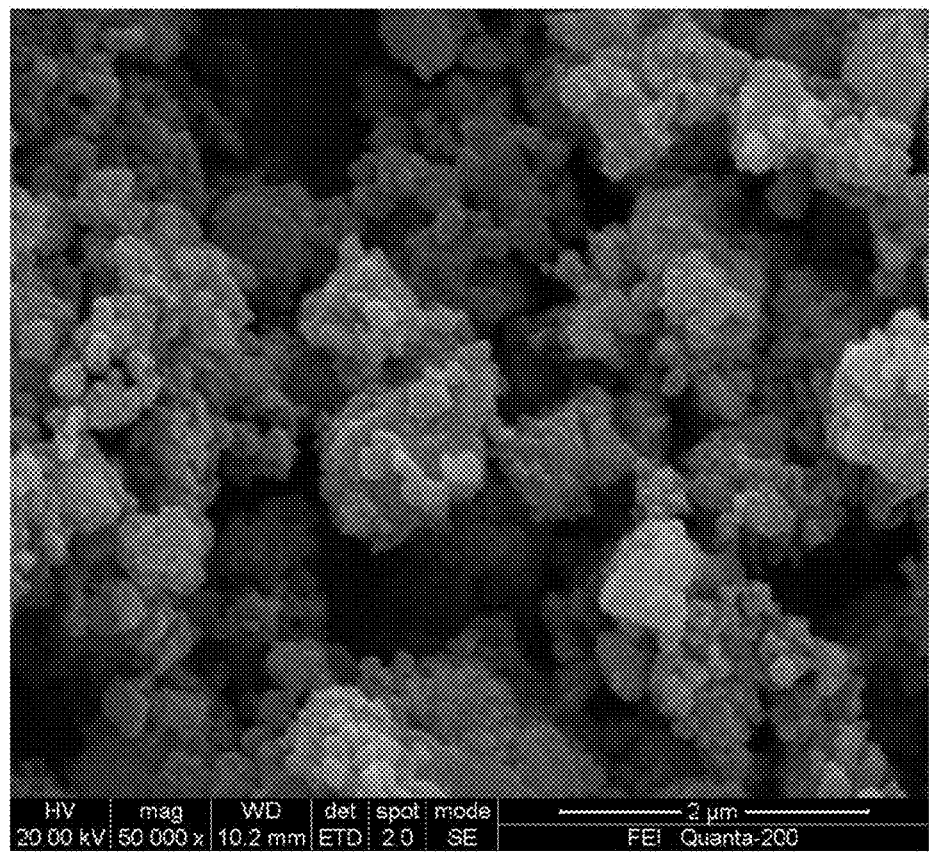
FIG. 1 is a SEM image of graphene-based LiFePO$_4$/C composite material obtained in Example 1.
Figure 2:
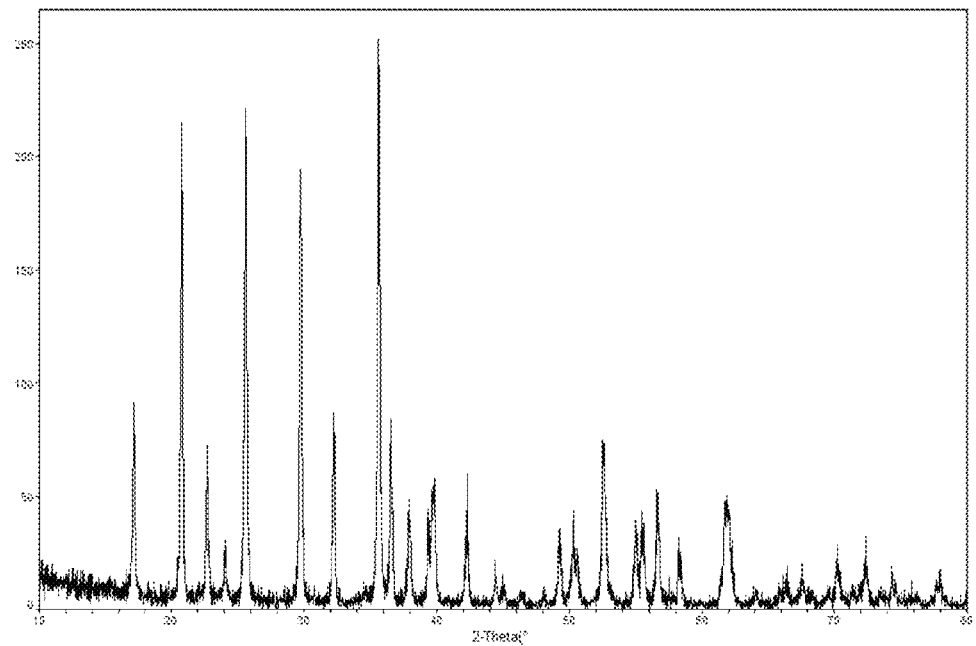
FIG. 2 is a XDR image of graphene-based LiFePO$_4$/C composite material obtained in Example 1.

The resulted iron salt solution having graphene oxide dispersed therein and the resulted phosphoric acid solution are added in parallel flow to a reactor equipped with a stirrer in a Fe:P molar ratio of 1:1.1. Meanwhile, the reaction liquor is adjusted to pH 2.1 using ammonia with a concentration of 1 mol/L, and then reacts under controlled temperature of 60° C. for 5 hours to give an emulsion. The resulted emulsion is filtered, washed and the residue is dried at 80° C. in an air dry oven for 24 hours, to give ferric phosphate/graphene oxide precursor;

The resulted ferric phosphate/graphene oxide precursor is blended with lithium salt in Li:Fe molar ratio of 1.05:1, subjected to ball milling after adding glucose which is 20% of the theoretical mass of lithium iron phosphate, and then sintered under a reducing atmosphere condition of Ar:$H_2$=90:10 (v/v) at 650° C. for 8 hours, to obtain graphene-based LiFePO$_4$/C composite materials. FIGS. 1 and 2 are the SEM image and the XRD image of the material obtained in Example 1, showing that the produced particles is small and evenly dispersed, with regular morphology and clear interface between the particles, which means that its grain morphology growth is complete. In the XRD spectrum, the characteristic peaks are relatively obvious, no impurity peak are found, and the diffraction peaks are relatively sharp, showing the synthetized product crystallizes well.

Example 2

Graphene oxide and ferric nitrate are dissolved in deionized water in graphene oxide:iron weight ratio of 0.2:1, to prepare a mixture solution with an iron ion concentration of 0.5 mol/L, and then dispersed by ultrasonic for 3 hours, to obtain an iron salt solution having graphene oxide dispersed therein;

An ammonium biphosphate solution is prepared, with a concentration of 0.5 mol/L.

The resulted iron salt solution having graphene oxide dispersed therein and the ammonium biphosphate solution are added in a Fe:P molar ratio of 1:1 in parallel flow to a reactor equipped with a stirrer. Meanwhile, the reaction liquor is adjusted to pH 2.5 using aqueous sodium hydroxide solution with a concentration of 0.5 mol/L, and then reacts under controlled temperature of 80° C. for 3 hours to give an emulsion. The resulted emulsion is filtered, washed and the residue is dried at 80° C. in an air dry oven for 24 hours, to give a ferric phosphate/graphene oxide precursor;

The resulted ferric phosphate/graphene oxide precursor is blended with lithium salt in Li:Fe molar ratio of 1.02:1, subjected to ball milling after adding sucrose which is 10% of the theoretical mass of lithium iron phosphate and then sintered under a reducing atmosphere condition of $Ar:H_2=95:5$ (v/v) at 700° C. for 5 hours, to obtain graphene-based $LiFePO_4/C$ composite materials.

Figure 3:
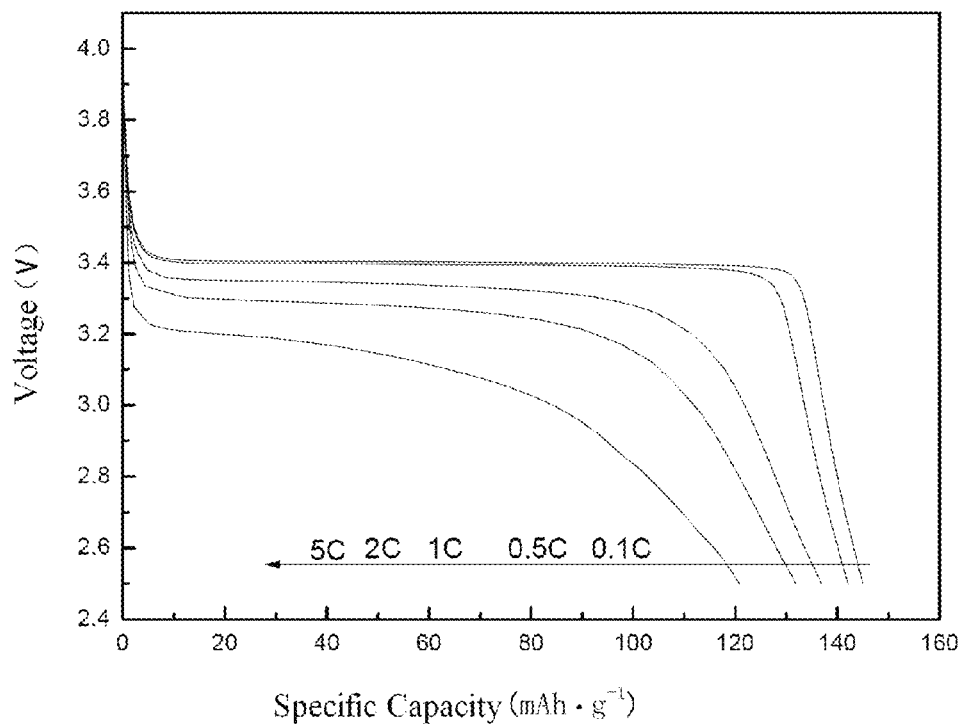
FIG. 3 is the charge-discharge curve at different rates of the lithium ion battery in which the graphene-based LiFePO$_4$/C composite material obtained in Example 2 is used as cathode material.

FIG. 3 is the charge-discharge curve at different rates of the lithium ion battery in which the graphene-based $LiFePO_4/C$ composite material obtained in Example 2 is used as cathode material. The discharge specific capacities at 0.5C, 1C, 2C and 5C are maintained above 140 mA·h/g, 137 mA·h/g, 130 mA·h/g and 120 mA·h/g, respectively, and the discharge voltage platform maintains well.

Example 3

Graphene oxide and ferrous sulfate are dissolved in deionized water in graphene oxide:iron weight ratio of 0.3:1, and are oxidized by excess $H_2O_2$, to prepare a mixture solution with an iron ion concentration of 2 mol/L, and then dispersed by ultrasonic for 3 hours, to obtain an iron salt solution having graphene oxide dispersed therein;

An ammonium monoacid phosphate solution is prepared, with a concentration of 2 mol/L.

The resulted iron salt solution having graphene oxide dispersed therein and the ammonium monoacid phosphate solution are added in a Fe:P molar ratio of 1:1 in parallel flow to a reactor equipped with a stirrer. Meanwhile, the reaction liquor is adjusted to pH 2.5 using aqueous sodium hydroxide solution with a concentration of 5 mol/L, and then reacts under controlled temperature of 80° C. for 3 hours to give an emulsion. The resulted emulsion is filtered, washed and the residue is dried at 80° C. in an air dry oven for 24 hours, to give ferric phosphate/graphene oxide precursor;

The resulted ferric phosphate/graphene oxide precursor is blended with lithium salt in Li:Fe molar ratio of 1:1, subjected to ball milling after adding starch which is 5% of the theoretical mass of lithium iron phosphate and then sintered under a reducing atmosphere condition of $Ar:H_2=90:10$ (v/v) at 600° C. for 10 hours, to obtain graphene-based $LiFePO_4/C$ composite materials.

Figure 4:
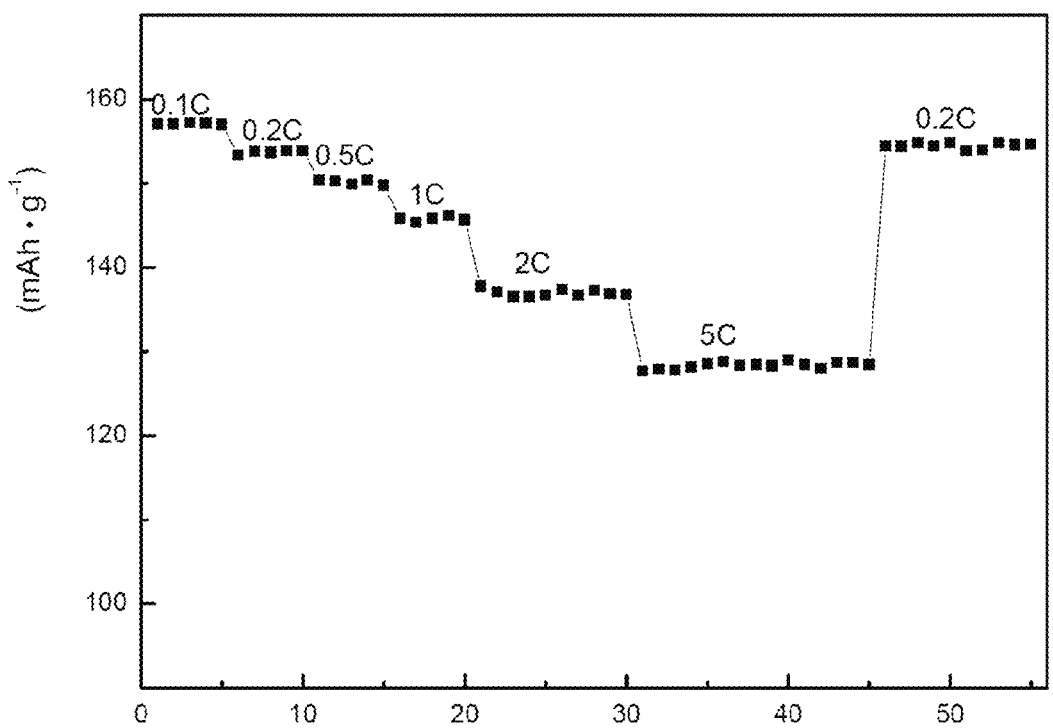
FIG. 4 is the recycle performance curve at different rates of the lithium ion battery in which the graphene-based LiFePO$_4$/C composite material obtained in Example 3 is used as cathode material.

FIG. 4 is the recycle performance curve at different rates of the lithium ion battery in which the graphene-based $LiFePO_4/C$ composite material obtained in Example 3 is used as cathode material. The product has good recycle stability at different rates, discharge specific capacity of cathode material has no significant attenuation at each ratio, and the discharge specific capacity under rate of 5C keeps at 125 mA·h/g. After tests at different rates, recovery is performed at 0.2C rate and the capacity remains well, indicating that the composite material has good structural stability.

The invention claimed is:

1. A method for preparing a graphene-based $LiFePO_4/C$ composite material, comprising:
   dissolving a graphene oxide and an iron salt in a deionized water, a mass ratio of the graphene oxide over an iron element in the iron salt being 0.1:1 to 0.3:1;
   dispersing the graphene oxide by ultrasonic to obtain an iron salt solution having the graphene oxide dispersed therein;
   mixing the iron salt solution with a phosphate solution to obtain a reaction mixture, in which a molar ratio of Fe:P is 1:1 to 1:1.2;
   adjusting a pH value of the reaction mixture to 2 to 4;
   controlling a temperature of the reaction mixture to allow the reaction mixture to react at 60° C. to 80° C. to obtain an emulsion;
   filtering the emulsion to obtain a ferric phosphate/graphene oxide precursor;
   blending the ferric phosphate/graphene oxide precursor with a lithium salt at a Li:Fe molar ratio of 1:1 to 1.05:1 to form a first mixture;
   adding a carbon source to the first mixture to form a second mixture; and
   sintering the second mixture under a reducing atmosphere condition at 600° C. to 700° C., to obtain the graphene-based $LiFePO_4/C$ composite material.

2. The method according to claim 1, wherein an iron ion concentration in the iron salt solution is 0.5 to 2 mol/L.

3. The method according to claim 1, wherein dispersing the graphene oxide by ultrasonic includes dispersing the graphene oxide by ultrasonic for 2 to 5 hours.

4. The method according to claim 1, wherein
   controlling the temperature of the reaction mixture to allow the reaction mixture to react includes allowing the reaction mixture to react for 3 to 6 hours; and
   sintering includes sintering for 5 to 10 hours.

5. The method according to claim 1, wherein dissolving the iron salt solution in the deionized water includes dissolving at least one of a ferric sulphate, a ferric chloride, or a ferric nitrate in the deionized water.

6. The method according to claim 1, wherein mixing the iron salt solution with the phosphate solution includes mixing the iron salt solution with a solution of at least one of a phosphoric acid, an ammonium biphosphate, an ammonium monoacid phosphate, an ammonium phosphate, a sodium biphosphate, a sodium monoacid phosphate, or a sodium phosphate.

7. The method according to claim 1, wherein adjusting the pH value of the reaction mixture includes adjusting the pH value of the reaction mixture using an alkaline solution having a concentration of 0.5 to 5 mol/L, the alkaline solution including a solution of a sodium hydroxide, a sodium carbonate, or an ammonia.

8. The method according to claim 1, wherein blending the ferric phosphate/graphene oxide precursor with the lithium salt includes blending the ferric phosphate/graphene oxide precursor with at least one of a lithium carbonate, a lithium hydroxide, or a lithium acetate.

9. The method according to claim 1, wherein adding the carbon source includes adding at least one of a glucose, a sucrose, a fructose, a lactose, a citric acid, a starch, a polyvinyl alcohol, a polypropylene, or a phenolic resin, having an amount equaling to 5 to 20% of a theoretical mass of a lithium iron phosphate.

10. The method according to claim 1, wherein sintering under the reducing atmosphere condition includes sintering in a mixed gas having a volume ratio of $Ar:H_2=90:10$ to $95:5$ or of $N_2:H_2=90:10$ to $95:5$.

11. The method according to claim 1, further comprising:
    washing and drying the emulsion after filtering the emulsion.

12. The method according to claim 1, further comprising:
    performing a ball milling on the second mixture.

13. The method according to claim 1, wherein dissolving the iron salt in the deionized water includes:
    dissolving a ferrous salt in the deionized water, the ferrous salt including at least one of a ferrous sulfate, a ferrous chloride, or a ferrous nitrate; and
    oxidizing the ferrous salt using an excess $H_2O_2$.

\* \* \* \* \*